Jan. 13, 1970  M. W. GARLAND  3,489,334
DISCHARGE VALVE FOR RECIPROCATING COMPRESSORS
Filed March 25, 1968  5 Sheets-Sheet 3
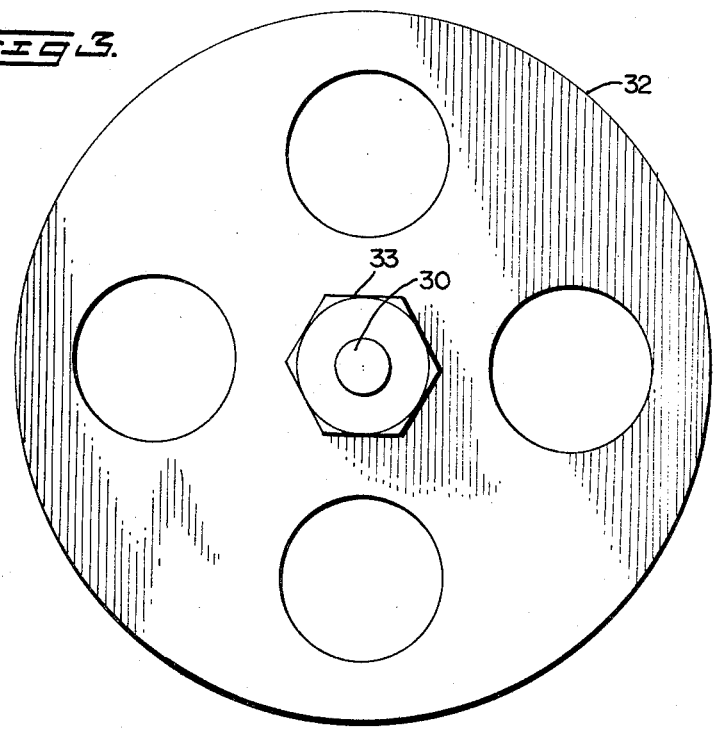
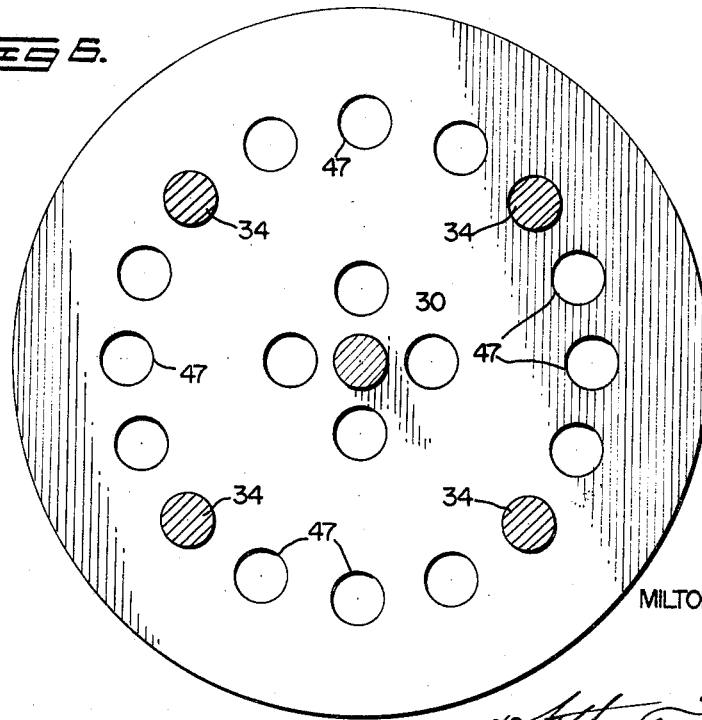
INVENTOR
MILTON W. GARLAND
ATTORNEY Jan. 13, 1970     M. W. GARLAND     3,489,334
DISCHARGE VALVE FOR RECIPROCATING COMPRESSORS
Filed March 25, 1968     5 Sheets-Sheet 4
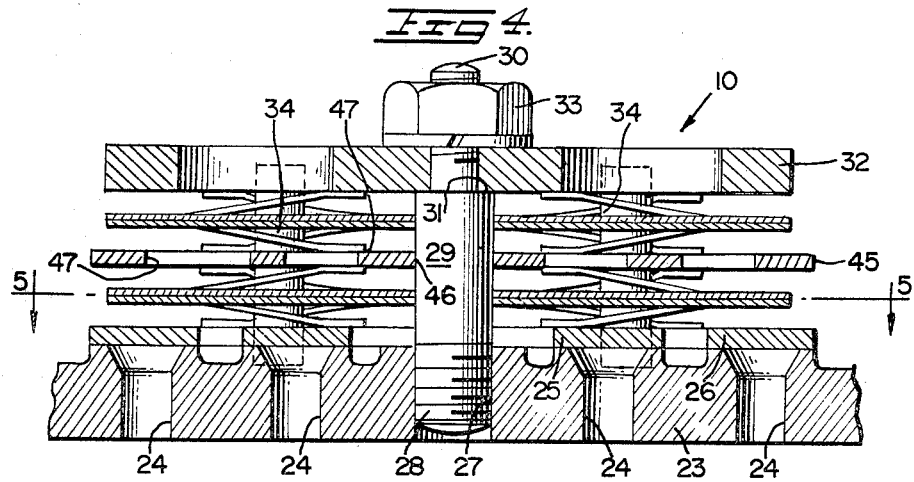
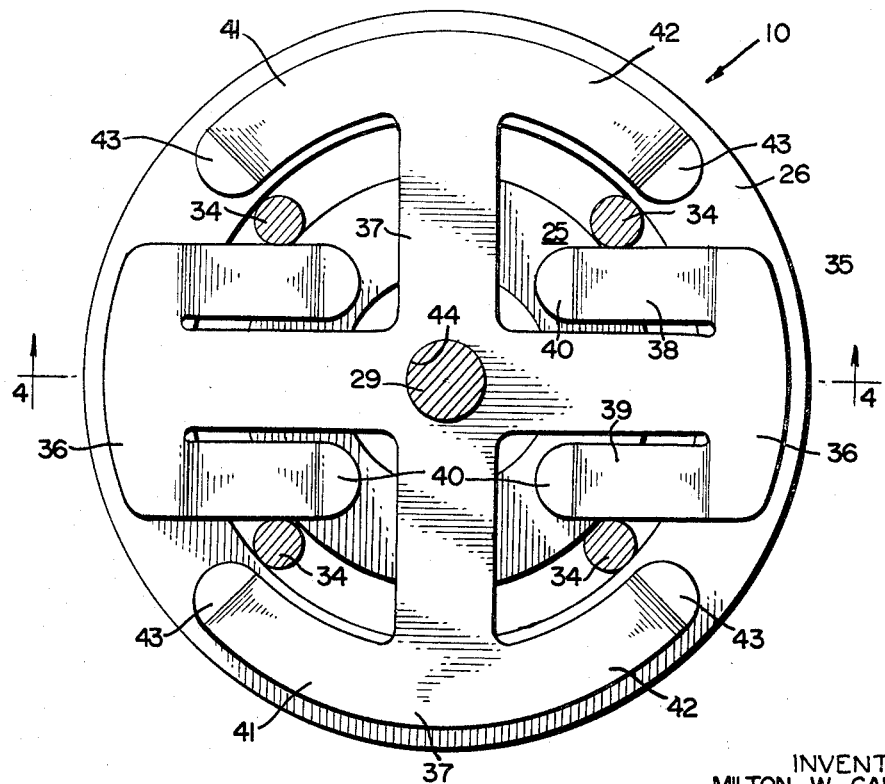
INVENTOR
MILTON W. GARLAND
ATTORNEY

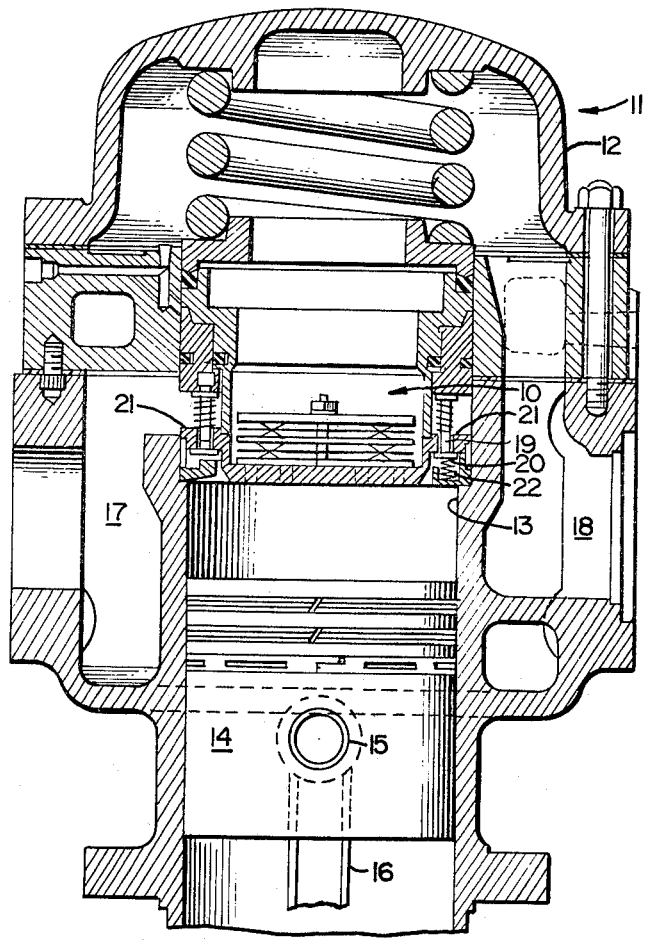

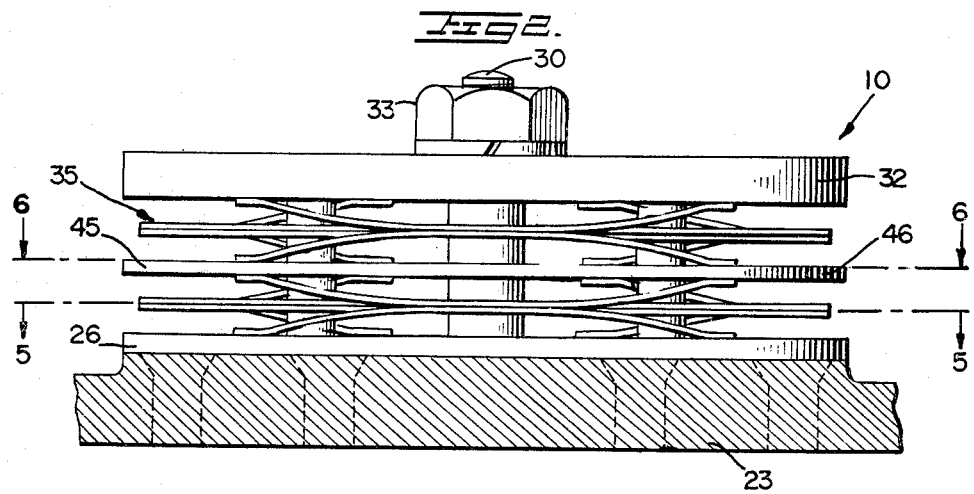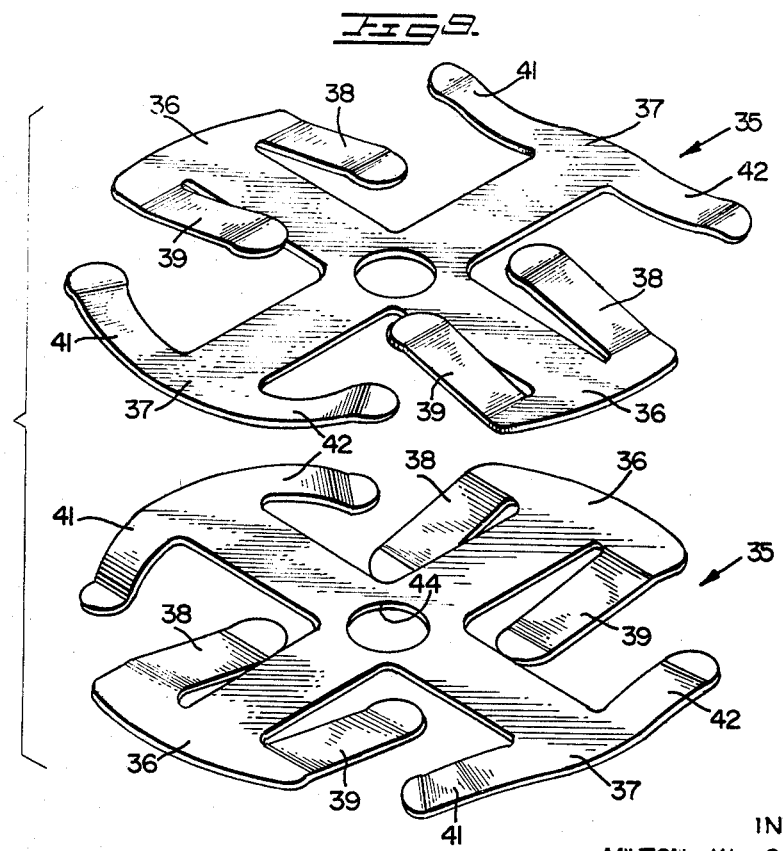

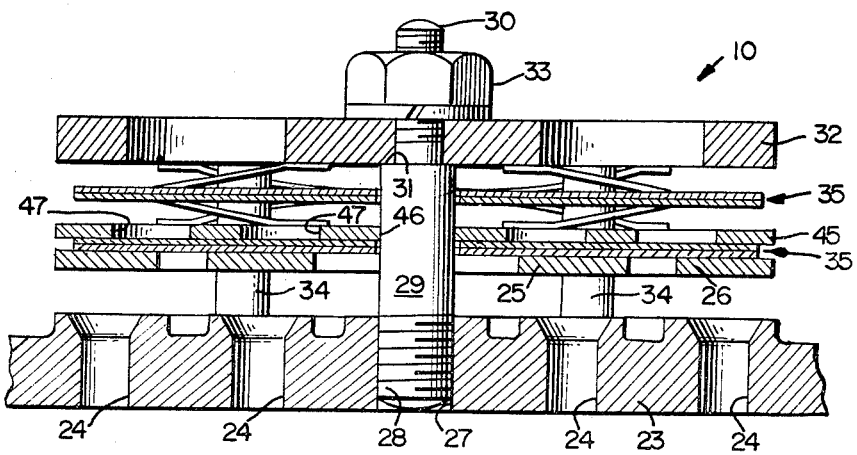
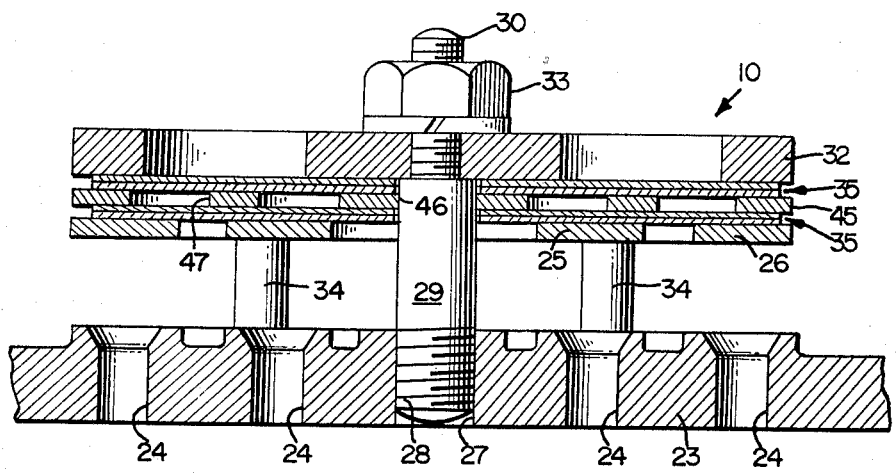

United States Patent Office 3,489,334
Patented Jan. 13, 1970

3,489,334
DISCHARGE VALVE FOR RECIPROCATING COMPRESSORS
Milton W. Garland, Waynesboro, Pa., assignor to Frick Company, Waynesboro, Pa., a corporation of Pennsylvania
Filed Mar. 25, 1968, Ser. No. 715,659
Int. Cl. F04b 39/10; F16k 15/14, 17/04
U.S. Cl. 230—231      12 Claims

ABSTRACT OF THE DISCLOSURE

The discharge valve for a reciprocating compressor comprises a valve seat body having a plurality of ports communicating with the working chamber of the reciprocating compressor and a discharge fluid passageway. A valve plate means to control flow of fluid through the ports is disposed to overlie the ports. A stud is secured at one end to the valve seat body and a retainer plate is secured to the stud in spaced parallel relationship to the valve seat body. A plurality of spring elements, each of which have a plurality of leaf spring portions are slidably mounted on the stud between the retainer plate and valve seat body to bias the valve plate means in a seated or closed position over the ports. The spring elements are so constructed and arranged that the leaf spring portions of successive spring elements collapse as the valve plate means is lifted by the fluid pressure discharged through the ports.

---

This invention relates to valves and more particularly to discharge valves for reciprocating compressors.

Usually reciprocating compressor discharge valves comprise a movable valve element which is held in a seated or closed position by one or more springs. The biasing force exerted by the spring or springs is selected to hold the valve closed until a predetermined differential fluid pressure across the valve element is reached upon compression of the fluid in the cylinder. It has been found that the operative life of the discharge valves is a function of the lift of the movable valve element which may be in the order of .0625 inches and the r.p.m. of the compressor. Obviously, the greater the lift or movement of the valve element, the greater the flexure of the spring or springs. Also, the higher the r.p.m., the greater the number of flexures of the springs or spring per unit of time. Thus, with the trend toward higher capacity and increased r.p.m. of compressors, the more critical has become the operative life of the compressor valves. One frequent source for the relatively short operative life of compressor discharge valves has been found to be spring failures. Increasing the size of the springs does not solve the problem since this then alters the differential pressure at which the valve element will unseat or open. Increasing the strength of the springs also has the undesirable effect of increasing the impact stresses on the valve components. The reduction in the amount of lift to reduce flexure is not a solution to the problem, since such reduced movement would adversely affect capacity and efficiency of the compressor.

Accordingly, it is an object of this invention to provide an improved discharge valve for a reciprocating compressor, which valve has a relatively long operative life.

Another object of the present invention is to provide an improved discharge valve for a reciprocating compressor in which valve impact stresses are substantially minimized.

A further object of the present invention is to provide an improved discharge valve for a reciprocating compressor, which is relatively simple and inexpensive in construction and easy to assemble.

A still further object of this invention is to provide an improved discharge valve for a reciprocating compressor, which valve is positive acting, free of chattering and presents minimum restriction to fluid discharge from the compression chamber.

The present invention, therefore, contemplates a novel discharge valve for a reciprocating compressor, which valve comprises a valve seat body having a plurality of ports communicating the compressor cylinder or compression chamber with the compressor fluid discharge passageway means. A valve element is constructed and arranged to seat against said valve seat body to seal the ports and slidably move, alternately, to a seated and unseated position. A plurality of spring elements are slidably mounted and positioned to bear against and bias the valve element in a seated position to close the ports in the valve seat body. Each spring element is constructed and arranged to provide a plurality of leaf springs or finger portions which are formed so as to flex a distance substantially equal to the ratio of the total lift to the number of spring elements. The plurality of spring elements cooperatively function to progressively increase the biasing force as the valve element moves to the fully unseated or open position to thereby minimize or dampen impact stress in the opening of the valve. The spring elements also provide for a quick return of the valve element to the seated or closed position with the frictional contact of the spring finger portions serving along with the progressively decreasing biasing force to minimize the return impact force.

The above and other objectives and advantages of the present invention will appear more fully hereinafter from a consideration of the detailed description which follows when taken together with the accompanying drawings wherein one embodiment of the invention is illustrated, and in which:

FIG. 1 is a cross sectional view through a reciprocating compressor having a discharge valve according to this invention;

FIG. 2 is side elevational view of the discharge valve shown in FIG. 1, somewhat enlarged;

FIG. 3 is a plan view of the discharge valve;

FIG. 4 is a cross sectional view taken along line 4—4 of FIG. 3;

FIG. 5 is a view in cross section taken along line 5—5 of FIG. 2;

FIG. 6 is a sectional view taken along line 6—6 of FIG. 2;

FIG. 7 is a view similar to FIG. 4 showing the valve in a partially open position;

FIG. 8 is another view similar to FIG. 4 showing the valve in a fully open position; and FIG. 9 is an exploded view in perspective showing the spring elements according to this invention.

Now referring to the drawings and, more particularly, to FIG. 1, 10 generally designates the discharge valve according to this invention which may be employed, as shown, in a reciprocating compressor 11. The compressor 11, since it forms no part of the present invention, will be described hereinafter in only sufficient detail to achieve an understanding of the construction and function of the discharge valve.

The compressor 11 comprises a cylinder head 12 secured to a crankcase (not shown) and has a cylinder or compression chamber 13 within which a piston 14 is disposed for reciprocation. The piston 14 is connected, for reciprocation, to a crankshaft (not shown) by a wrist pin 15 and connecting rod 16. Adjacent the top portion of cylinder 13, the cylinder head is provided with a suction or inlet passageway 17 and a discharge or outlet passageway 18. Inlet passageway 17 is connected to a source (not shown) of gaseous fluid to be compressed, such as refrigerant, while outlet passageway 18 is connected to discharge compressed gaseous fluid to a place of use or storage (not shown) such as a refrigerant condenser. Inlet passageway 17 communicates with cylinder 13 through a plurality of circumferentially spaced inlet ports 19. Fluid flow through inlet ports 19 is controlled by a ring plate 20 which is biased in a seated position against inlet valve seat body 21 by springs 22 (only one of which is shown). Communication of cylinder 13 with discharge passageway 18 is controlled by discharge valve 10, as hereinafter more fully explained.

As best shown in FIGS. 2 to 9, the discharge valve 10 comprises a valve seat body 23 in which are formed a plurality of circumferentially spaced discharge ports 24 arranged in two concentric circles. While valve seat body 23 is shown as an integral part of inlet valve seat body 21 without departure from the scope nad spirit of this invention. A valve element in the form of a ring plate 25 is dimensioned to overlie the inner row of discharge ports 24 while a second valve element in the form of a ring plate 26 is dimensioned to overlie the outer row of discharge ports 24. Both ring plates 25 and 26 and the upper surfaces of valve seat body 23, adjacent ports 24, are machined so that the ring plates and the surfaces adjacent the ports 24 engage in intimate, surface to surface contact. A threaded central bore 27 is provided in valve seat body 23 to receive a threaded end portion 28 of a retainer stud 29. The opposite threaded end portion 30 of stud 29 is of reduced diameter to form a shoulder 31 against which a retainer plate 32 is secured in abutment by a nut 33 turned upon threaded end portion 30 of stud 29. As best shown in FIG. 3, retainer plate 32 is provided with openings 32A.

The guidance of ring plates 25 and 26 from and to a seated position over ports 24 is achieved by four guide pins 34. The opposite ends of each guide pin 34 is receivable in aligned recesses in juxtaposed surfaces of valve seat body 23 and retainer plate 32. Each guide pin 34 is of such diameter as to fit in the annular space between ring plates 25 and 26 and allow free vertical movement of the ring plates with negligible lateral movement.

The ring plates 25 and 26 are biased in a seated or closed position by a spring assembly which includes a plurality of spring elements 35. As best shown in FIGS. 5 and 9, each spring element 35 is constructed of very thin gage spring steel and comprises a body portion in the form of a cross, having two pairs of oppositely extending arms 36 and 37. Each arm 36 has a substantially flat body portion and two leaf spring portions 38 and 39 which extend parallel to and on opposite sides of the arm. The leaf spring portions 38 and 39 are each bent to project into plane offset from the plane of the body portion of arms 36 and 37. As shown in FIGS. 4 and 5, in the spring element 35 next adjacent ring plate 25 and 26, leaf spring portions 38 and 39 are of such length as to engage the inner ring plate 25. The distal tip ends 40 of leaf spring portions 38 and 39 are bent to provide flat engagement surfaces. Similar to arm 36, each arm 37 has a substantially flat body portion and two leaf spring portions 41 and 42 which extend arcuately in opposite directions from the distal end of the arm body and project into a plane offset from flat body portions of arms 36 and 37. The arcurate shape of leaf spring portions 41 and 42 correspond to the diameter of the center of line of outer ring plate 26 so that the distal tip end portions 43 of the spring element 35 next adjacent the outer ring plate engages the latter. The distal tip end portions 43 are bent to provide flat engagement surfaces. At the juncture of cross arms 36 and 37 of each spring element 35, an opening 44 is provided to receive therethrough stud 29. Opening 44 is dimensioned to permit spring element 35 to freely slide along stud 29 parallel to the longitudinal axis of stud 29 with negligible lateral movement.

As shown best in FIGS. 2, 4 and 9, the plurality of spring elements 35 are stacked on stud 29 in pairs. the two spring elements 35 of each pair are arranged in back-to-back abutment so that the leaf spring portions 38, 39, 41 and 42 of arms 36 and 37 project in opposite directions. As best shown in FIGS. 2, 4 and 6, interposed between each pair of spring elements 35 is a bearing plate 45. Bearing plate 45 has a central opening 46 to receive stud 29 therethrough. The opening 46 is dimensioned to permit free, slidable movement of the bearing plate parallel to the longitudinal axis of stud 29 without appreciable lateral movement. A plurality of rows of circumferentially spaced holes 47 are provided in bearing plate 46 to permit freer flow of fluid past valve 10 when ring plates 25 and 26 are unseated and the valve is in the open position.

While two pairs of spring elements 35 are illustrated in the discharge valve 10, the invention is not limited thereto. It is contemplated by the present invention to provide one or more than two pairs of spring elements 35 without departure from the scope and spirit of this invention. Where one pair of spring elements 35 is employed, bearing plate 45 may be omitted from the assembly. The number of spring elements 35 employed in a particular discharge valve 10 is dependent upon various factors such as the total lift desired in relation to the gage metal of which the spring elements are made and the amount of offset leaf spring portions 38, 39, 41 and 42.

ASSEMBLY OF VALVE

In the assembly of discharge valve 10, stud 29 is first secured in valve seat body 23 by turning threaded end portion 28 into tapped bore 27 of the valve seat body 23. The ring plates 25 and 26 are positioned to overlie the inner and outer row of ports 24 in valve seat body 23. The spring elements 35 and bearing plate 45 are passed on stud 29 and arranged, as previously described, with the spring elements 35 in back-to-back relationship and a bearing plate 45 disposed between each pair of spring elements. The spring elements 35 of each pair may be displaced 90° of each other so that leaf spring portions 38 and 39 of one spring element 35 is above or below the leaf spring portions 41 and 42 of the adjacent spring element 35. The guide pins 34 may then be positioned to extend into their respective recesses in valve seat body 23. The retainer plate 32 is then passed over stud end portion 30 into abutment against shoulder 31 of stud 29 and positioned so that the distal ends of guide pins 34 enter their respective recesses in retainer plate 32. If nut 33 is not a self-locking nut, a lock washer 48 is passed over the threaded end portion 30 of stud 29 and nut 33 is turned upon threaded end portion 39 until retainer plate 32 is secured in tight abutment against shoulder 31. The leaf spring portions 38, 39, 41 and 42 are so proportioned that in the normal closed position of the discharge valve, each leaf spring portion is under a nominal tension which is predetermined to provide a total tensional force on ring plates 25 and 26 sufficient to prevent the opening or unseating of the ring plates until a predetermined fluid pressure is attained in compression chamber 13.

FUNCTION OF VALVE

In operation of discharge valve 10, when fluid drawn into compression chamber 13, through inlet ports 19, is compressed in chamber 13 upon the upward compression stroke of piston 14 to a value in excess of the biasing force exerted by spring elements 35, ring plates 25 and 26 are lifted off their seats. When the ring valve plates are lifted, leaf spring portions 38, 39, 41 and 42 of the first spring elements 35, which bear against ring plates 25 and 26, are forced toward the plane of the body portion of arms 36 and 37. As best shown in FIG. 7, after leaf spring portions 38, 39, 41 and 42 of the first spring element are fully collapsed or depressed, the leaf spring portions 38, 39, 41 and 42 of the next adjacent spring element are depressed as the ring plate continues to be lifted by fluid pressure. As leaf spring portions 38, 39, 41 and 42 of this second spring element are collapsed, the first and second spring elements slide upwardly along stud 29. Thereafter, as the ring plates 25 and 26 continue to be lifted, the bearing plate 45 and leaf spring portions 38, 39, 41 and 42 of successive spring elements are collapsed or depressed in turn, until all of the spring elements 35 and bearing plate 45 are in tight abutment against retainer plate 32 as is illustrated in FIG. 8. As the discharge valve 10 is actuated to a fully open position, as herein described, restriction to flow of compressed fluid past the discharge valve, into discharge passageway 18, is minimized by flow of fluid through opening 47 in the bearing plate 45, and openings 32A of retainer plate 32 and the spaces between the cross arms 36 and 37 of the spring elements 35.

When the fluid pressure exerted against ring plates 25 and 26 falls below the force exerted by the spring elements 35 in an opposite direction on ring plates 25 and 26 as the compressed fluid is exhausted from chamber 13, the leaf spring portions 38, 39, 41 and 42 return to their normal open positions in successive spring elements from retainer plate 32 to ring plates 25 and 26 until the ring plates are returned to a seated or closed position over ports 24 of valve seat body 23.

Pins 34 not only guide ring plates 25 and 26, spring elements 35 and bearing plate 45 in vertical movement relative to stud 29 but they also prevent rotative movement of spring elements 35 about stud 29 and thus maintain proper alignment of the spring elements.

Since the resistance to movement of ring plates 25 and 26 to a full open position progressively increases as those plates are lifted from their seated positions over ports 24, the impact stresses on the valve elements are substantially minimized. Also, since the force directed to reseal ring plates 25 and 26 progressively diminishes as the ring plates approach the closed or seated position, the impact stresses upon the valve components in closing are minimized. The frictional contact of the tip end portions of the leaf spring portions against the retainer plate, bearing plate and ring plates 25 and 26, further assists in reducing the impact stresses associated with the seating of ring plates 25 and 26.

It is also contemplated by the present invention to vary the gage or thickness of the spring elements 35 and arrange the spring elements from the ring plates 25 and 26 to retainer plate 32 in an order of weakest to the strongest. This modification provides a low resistance to opening with appreciably greater resistance as the valve fully opens and insures a rapid return to a seated position.

It is believed now readily apparent that an improved discharge valve has been disclosed for a reciprocating compressor, which valve has a relatively long operative life, even at relatively high compressor r.p.m., since the maximum flexure of each leaf spring portion of the spring elements is of small magnitude and impact stresses on the valve components are minimized. It is a discharge valve of relatively simple construction which is easy and inexpensive to fabricate and assemble.

What is claimed is:
1. A discharge valve for a reciprocating compressor comprising
   (a) a valve seat body having a plurality of ports therethrough,
   (b) a valve element dimensioned and disposed to abut the valve seat body to control flow of fluid through said ports,
   (c) a retainer means spaced from said valve seat element,
   (d) a plurality of movable spring elements disposed between the valve seat body and the retainer means and in engagement with the valve element to bias said valve element in abutment against the valve seat body,
   (e) each of said spring elements having a plurality of leaf spring portions arranged in pairs at the distal end portions of crossed arms and adapted to exert a biasing force at spaced points on said valve element, and
   (f) guide means for guiding said spring elements and said valve element in movement during the opening and closing of said ports.

2. The valve of claim 1 wherein each of said plurality of spring elements are arranged in pairs with the spring elements of each pair disposed in back-to-back relationship to each other.

3. The valve of claim 1 wherein each spring element comprises a body portion forming crossed arms with plurality of integral leaf springs extending from the distal end portions of each of the arms into a plane offset from the plane of the body portion.

4. The apparatus of claim 1 wherein said guide means includes a stud secured at one end in the valve seat body and the opposite end supporting the retainer means and including a plurality of spaced guide pins extending between the valve seat body and the retainer means.

5. The apparatus of claim 1 wherein said plurality of vertically movable spring elements are arranged in pairs with each pair separated by a vertically movable bearing plate.

6. The apparatus of claim 1 wherein said plurality of ports are arranged in two concentric circles of circumferentially spaced ports, the valve element being two ring plates dimensioned to overlie each of the two concentric circles of ports, and wherein the guide means includes a plurality of spaced pins extending between the valve seat body and retainer plate and positioned between the two ring plates to retain and guide the ring plates in vertical movement to and from a seated position against the valve seat body to thereby alternately open and close said ports to fluid flow therethrough.

7. The apparatus of claim 1 wherein said leaf spring portions of each of the spring elements provides, as the valve element is forced out of abutment with the valve seat body and is moved to a fully open position, a progressively increased biasing force.

8. A discharge valve for a reciprocating compressor having a reciprocating piston disposed in a cylinder to compress the trapped gaseous fluid delivered to said cylinder, the valve comprising
   (a) a valve seat body having two concentrically arranged circles of circumferentially spaced ports communicating with the compressor cylinder to pass compressed gaseous fluid from the cylinder when a predetermined pressure is reached,
   (b) a ring plate for each of the two circles of ports and dimensioned to overlie each of the circles in abutment against the valve seat body,
   (c) a stud secured at one end to the valve seat body,
   (d) a retainer plate secured to the distal end of said stud in spaced relation to the valve seat body,
   (e) a plurality of spring elements mounted on said stud by slidable movement relative to said stud and in engagement with the retainer plate and the two ring plates to bias the latter in abutment against the valve seat body and over the ports,
   (f) each of said spring elements having a plurality of spaced leaf spring portions extending to a plane offset from the other portions of the spring element to exert a biasing force at spaced points on each of the ring plates, and
   (g) guide means for retaining and guiding the ring plates in movement toward and away from abutment against the valve seat body,
   (h) said plurality of spring elements being arranged in pairs with each pair separated by a bearing plate slidably supported on the stud.

9. The apparatus of claim 8 wherein each spring element comprises a body portion forming crossed arms with a plurality of integral leaf springs extending from the distal end portions of each of the arms into a plane offset from the plane of the body portion.

10. The apparatus of claim 8 wherein said plurality of spring elements are arranged in pairs in abutting relationship with the leaf spring portions of one spring element extending in an opposite direction from the leaf spring portion of the other spring element.

11. The apparatus of claim 8 wherein said plurality of spring elements are arranged in pairs in abutting relationship with the leaf spring portions of one spring element extending in an opposite direction from the leaf spring portion of the other spring element, the spring elements of each pair of spring elements being offset from each other 90° in a horizontal plane.

12. The apparatus of claim 8 wherein the spring element next adjacent the ring plates is of relatively thin gage resilient material with successive spring elements of progressively thicker gage resilient material to provide quick return of the ring plates to a seated position over the ports.

References Cited
UNITED STATES PATENTS

| | | | |
|---|---|---|---|
| 1,385,147 | 7/1921 | Prellwitz | 137—516.13 |
| 1,971,171 | 8/1934 | Bebbington | 137—516.13 |
| 2,804,090 | 8/1957 | Kehler | 137—516.13 |

ROBERT M. WALKER, Primary Examiner

U.S. Cl. X.R.

137—516.13